(12) United States Patent
Bolam

(10) Patent No.: US 12,237,751 B2
(45) Date of Patent: Feb. 25, 2025

(54) ELECTRICALLY POWERED ENGINE

(71) Applicant: Robert Cameron Bolam, Denbighshire (GB)

(72) Inventor: Robert Cameron Bolam, Denbighshire (GB)

( * ) Notice: Subject to any disclaimer, the term of this patent is extended or adjusted under 35 U.S.C. 154(b) by 48 days.

(21) Appl. No.: 18/036,689

(22) PCT Filed: Nov. 19, 2021

(86) PCT No.: PCT/EP2021/082382
§ 371 (c)(1),
(2) Date: May 12, 2023

(87) PCT Pub. No.: WO2022/106664
PCT Pub. Date: May 27, 2022

(65) Prior Publication Data
US 2023/0415903 A1  Dec. 28, 2023

(30) Foreign Application Priority Data

Nov. 19, 2020 (GB) ...................................... 2018240
May 19, 2021 (GB) ...................................... 2107186

(51) Int. Cl.
*H02K 7/00* (2006.01)
*B64C 11/00* (2006.01)
(Continued)

(52) U.S. Cl.
CPC ............ *H02K 7/006* (2013.01); *B64C 11/001* (2013.01); *B64C 11/48* (2013.01); *H02K 1/2706* (2013.01); *H02K 1/32* (2013.01); *H02K 16/02* (2013.01)

(58) Field of Classification Search
CPC ........ H02K 7/006; H02K 1/2706; H02K 1/32; H02K 16/02; B64C 11/001; B64C 11/48; B64C 11/00; B64D 27/24; Y02T 50/60
See application file for complete search history.

(56) References Cited

U.S. PATENT DOCUMENTS 7,802,425 B2  9/2010  Fries et al.
9,143,023 B1  9/2015  Uskert
(Continued)

FOREIGN PATENT DOCUMENTS

GB  1282485  7/1972

OTHER PUBLICATIONS

International Search Report and Written Opinion for PCT/EP2021/082382 dated Feb. 14, 2022.

*Primary Examiner* — Dapinder Singh
(74) *Attorney, Agent, or Firm* — Stephen J. Weyer, Esq.; Stites & Harbison, PLLC

(57) ABSTRACT

According to the subject-matter of the present disclosure, there is provided an electrically powered fan engine. The fan engine includes: an energiser chamber between an inlet and an exhaust of the electrically powered fan engine; a first rotor within the energiser chamber, the first rotor including a plurality of blades and being configured to receive a fluid from the inlet and configured to rotate at a first velocity; and a second rotor within the energiser chamber, the second rotor including a plurality of blades and being configured to receive the fluid after passing through the first rotor and configured to rotate at a second velocity. The first velocity is different from the second velocity.

18 Claims, 3 Drawing Sheets

(51) Int. Cl.
*B64C 11/48* (2006.01)
*H02K 1/27* (2022.01)
*H02K 1/2706* (2022.01)
*H02K 1/32* (2006.01)
*H02K 16/02* (2006.01)

(56) References Cited

U.S. PATENT DOCUMENTS

| | | | |
|---|---|---|---|
| 11,649,049 B2 * | 5/2023 | Green | B64U 30/24 244/17.23 |
| 2009/0133394 A1 | 5/2009 | Fries et al. | |
| 2018/0066586 A1 * | 3/2018 | Brostmeyer | F02C 3/06 |
| 2020/0070990 A1 | 3/2020 | Harvey | |
| 2020/0227966 A1 * | 7/2020 | Harvey | H02K 3/28 |
| 2020/0227988 A1 * | 7/2020 | Zhu | B64C 11/46 |
| 2021/0324802 A1 * | 10/2021 | Bonnoitt | F01D 15/10 |

* cited by examiner

ELECTRICALLY POWERED ENGINE

TECHNICAL FIELD

The subject-matter of the present disclosure relates to an electrically powered fan engine.

BACKGROUND ART

GB1282485 describes an electric motor driven fan assembly. The present inventor is unaware of any production examples of the device described in GB1282485. This is most likely due to how inefficient the fan assembly would be in practice.

It is an aim of the present disclosure to alleviate such problems and improve on the prior art.

SUMMARY

According to an aspect of the present disclosure, there is provided an electrically powered fan engine including: an energiser chamber between an inlet and an exhaust of the electrically powered fan engine; a first rotor within the energiser chamber, the first rotor including a plurality of blades and being configured to receive a fluid from the inlet and configured to rotate at a first velocity; and a second rotor within the energiser chamber, the second rotor including a plurality of blades and being configured to receive the fluid after passing through the first rotor and configured to rotate at a second velocity, wherein the first velocity is different from the second velocity. The first and second velocities being different increases efficiency of the engine.

In an embodiment, the first rotor is configured to rotate in a first direction, the second rotor is configured to rotate in a second direction, and wherein the first direction is different from the second direction. The first direction being different from the second direction means the first and second rotors are configured to contra-rotate. Contra-rotating rotors increases efficiency because the second rotor reduces the swirling motion induced in the airflow by the first rotor.

In an embodiment, the first rotor and the second rotor are independently driven, and wherein a first speed of the first rotor is different from a second speed of the second rotor. The difference between the first and second speeds means that the pressure change across the rotors can be tailored to further improve efficiency.

In an embodiment, the first rotor and the second rotor are axially aligned.

In an embodiment, the electrically powered fan engine further comprises a static guide vane between the first rotor and the second rotor, the static guide vane include a plurality of blades configured to control an angle of incidence of the fluid to the blades of the second rotor. Controlling the angle of incidence of the fluid to the blades of the second rotor improves efficiency by improving the pressure gain across the second rotor.

In an embodiment, the first rotor, the static guide vane, and the second rotor each include a hub from which the respective blades extend radially.

In an embodiment, the hubs of each of the first rotor, the static guide vane, and the second rotor cooperate with an interior surface of the energiser chamber to gradually decrease a cross-sectional area of the energiser chamber from the inlet to the exhaust.

By decreasing the cross-sectional area of the energiser chamber, the engine has improved efficiency by increasing the flow velocity through the energiser chamber and thus further increasing the pressure of the fluid, or at least reducing any pressure losses.

In an embodiment, the hubs of each of the first rotor, the static guide vane, and the second rotor combine to form a substantially frusto-conical shaped surface having a diameter that gradually increases from the inlet to an exhaust.

In an embodiment, the hub of the static guide vane includes a front stub axle and a rear stub axle respectively extending fore and aft therefrom, and wherein the hub of the first rotor and the hub of the second rotor are journalled about the respective front and rear stub axles.

In an embodiment, the electrically powered fan engine further comprises an exhaust nozzle at the exhaust and an exhaust fairing extending from the hub of the second rotor, wherein the exhaust nozzle and the exhaust fairing cooperate to maintain a cross sectional area of the exhaust from the energiser chamber to downstream.

In an embodiment, the exhaust nozzle is convergent and the exhaust fairing is substantially bullet shaped.

In an embodiment, the first rotor includes a rim and the second rotor includes a rim.

In an embodiment, the electrically powered fan engine further comprises a first electromagnetic circuit configured to drive the rim of the first rotor and a second electromagnetic circuit configured to drive the rim of the second rotor.

In an embodiment, the first electromagnetic circuit includes a plurality of windings and a stator iron mounted to a wall surrounding the energiser chamber and a rotor iron and a plurality of magnets mounted to the rim of the first rotor, and wherein the second electromagnetic circuit includes a plurality of windings and a stator iron mounted to the wall surrounding the energiser chamber, and a rotor iron and a plurality of windings mounted to the rim of the second rotor.

In an embodiment, the electrically powered fan engine further comprising a by-pass duct extending between a by-pass inlet and a by-pass outlet, wherein the by-pass inlet is positioned upstream of the first rotor, and wherein the by-pass outlet is positioned in the exhaust nozzle.

In an embodiment, the first electromagnetic circuit and the second electromagnetic circuit are each provided within the by-pass duct for cooling, in-use. In this way, the electromagnetic circuits are cooled passively, making the engine more energy efficient.

In an embodiment, the static guide vane includes a rim coupled to an interior surface of the wall, wherein the rim includes a fluid passage to enable fluid to pass from the by-pass inlet to the by-pass outlet.

In an embodiment, the electrically powered fan engine further comprises a pylon attachment, wherein the static guide vane is coupled to the pylon attachment to transmit a thrust force thereto.

In an embodiment, the electrically powered fan engine is for providing thrust and/or lift to an aircraft.

In an embodiment, the fluid is air.

According to an aspect of the present disclosure, there is provided an electrically powered fan engine comprising: an energiser chamber between an inlet and an exhaust of the electrically powered fan engine; a first rotor within the energiser chamber, the first rotor including a plurality of blades and being configured to receive a fluid from the inlet and configured to rotate at a first velocity; a second rotor within the energiser chamber, the second rotor including a plurality of blades and being configured to receive the fluid after passing through the first rotor and configured to rotate at a second velocity; and a static guide vane between the first rotor and the second rotor, the static guide vane includes a plurality of blades configured to control an angle of incidence of the fluid to the blades of the second rotor.

According to another aspect of the invention there is provided a ducted rim driven fan device which is powered by means of electromagnetic motor circuitry and configured to have two contra-rotating fan rotors which are caused to contra-rotate about static stub axles that are mechanically attached to a static support structure positioned in axial alignment between the fan rotors.

A fan device of the invention may comprise of two axially aligned fan rotors or may be an assembly of three or more axially aligned fan rotors wherein each successive pair of fan rotors is located either side of a static support structure.

Preferably a fan device of the invention shall be configured so that the static support part of the device, namely the structural stator, is configured with one or more fixed axles to provide bearing support for the fan rotors.

Preferably a fan device of the invention may be configured to operate from a single or polyphase alternating electrical current supply, although a fan device of the invention may also be configured to operate from a direct electrical current supply.

Preferably a fan device of the invention may be configured with copper windings although a fan device of the invention may also be configured with aluminium windings or windings made from any other suitable electrically conducting materials.

Preferably a fan device of the invention shall be configured as a permanent magnet synchronous motor although a fan device of the invention may also be configured as an induction motor or a switched reluctance motor or a hybrid combination of such motor technologies.

Such a fan device of the invention could be installed in an aircraft and configured so that it can generate the forces of lift, thrust or drag to act on the aircraft.

According to an aspect of the present disclosure, there is provided an aircraft comprising the aforementioned electrically powered fan engine.

BRIEF DESCRIPTION OF THE FIGURES

The embodiments of the present disclosure are best understood with reference to the accompanying figures, in which.

DETAILED DESCRIPTION

Figure 1:
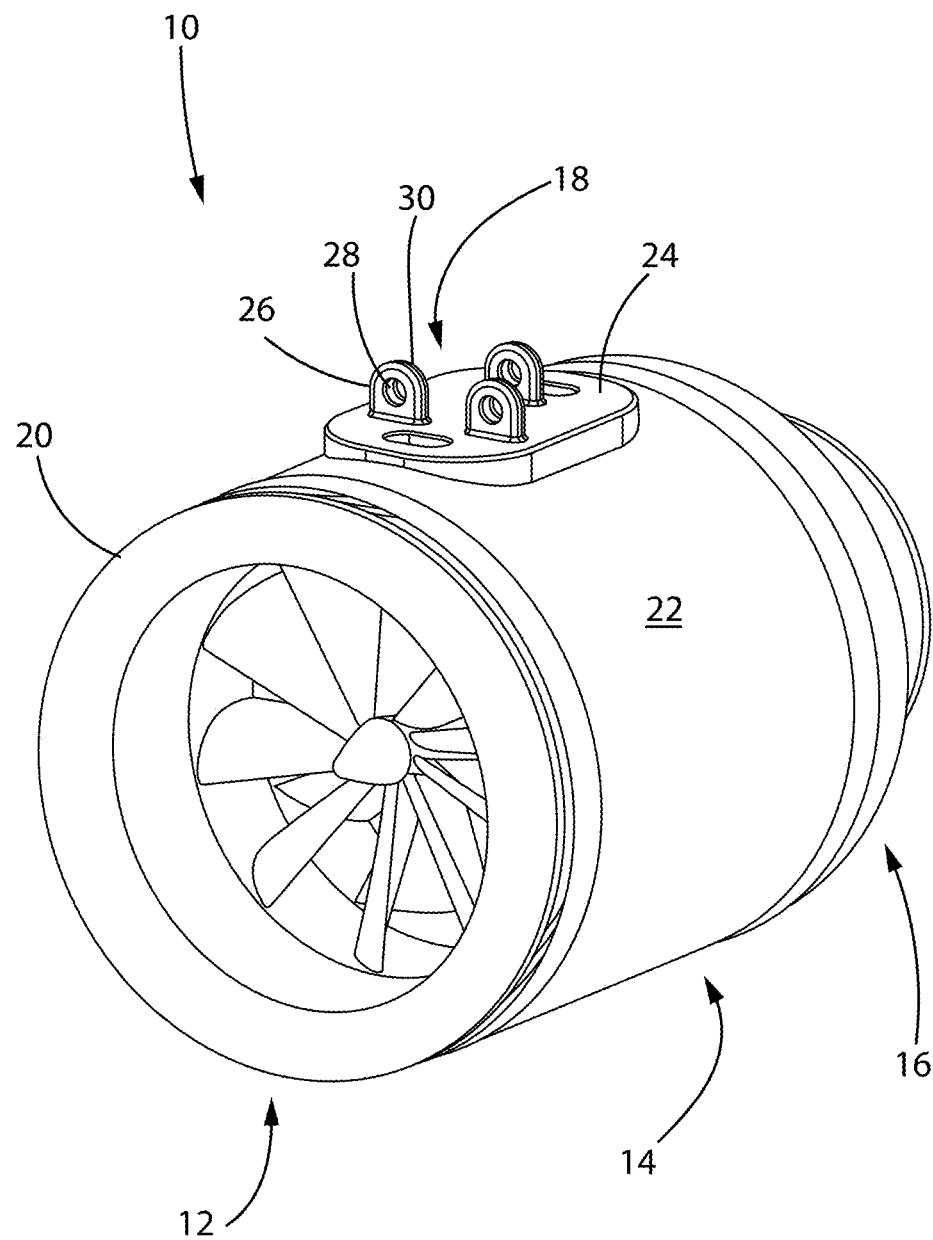
FIG. 1 is a perspective view of an electrically powered fan engine according to an embodiment of the present disclosure.

With reference to FIG. 1, an electrically powered fan engine 10 is provided in the form of an aircraft engine. The electrically powered fan engine 10 includes an intake 12 (or inlet), an energiser chamber 14, an exhaust nozzle 16 (or exhaust), and a pylon attachment 18.

The intake 12 is substantially circular. The intake 12 includes a rim 20, having a dome shaped cross-section. The rim 20 surrounds the intake 12 to allow a fluid, e.g. air, to enter the energiser chamber 14.

The energiser chamber 14 is between the intake 12 and the exhaust 16 nozzle, and is surrounded by a wall 22. The wall 22 is substantially cylindrical. The pylon attachment 18 is attached to the wall 22. The pylon attachment 18 includes a plate 24 fixed to an upper section of the wall 22 when in-use. The plate 24 is substantially integrally formed with the wall 22. In other embodiments, the plate 24 is attached to the wall 22 with bolts. A plurality of flanges 26 are attached to the plate 24. There are three flanges 26 in this embodiment. Other embodiments may include more or fewer flanges 26.

The flanges 26 include a through-hole 28, and a dome shaped head 30. The through-holes 28 allow through-passage of an attachment device, such as a bolt, to attach to electrically powered fan engine 10 to a wing of an aircraft being propelled by it or to provide lift if vertical take-off and landing is desired.

The exhaust nozzle 16 extends rearwards from the energiser chamber 14. The exhaust nozzle 16 is a converging nozzle.

Figure 2:
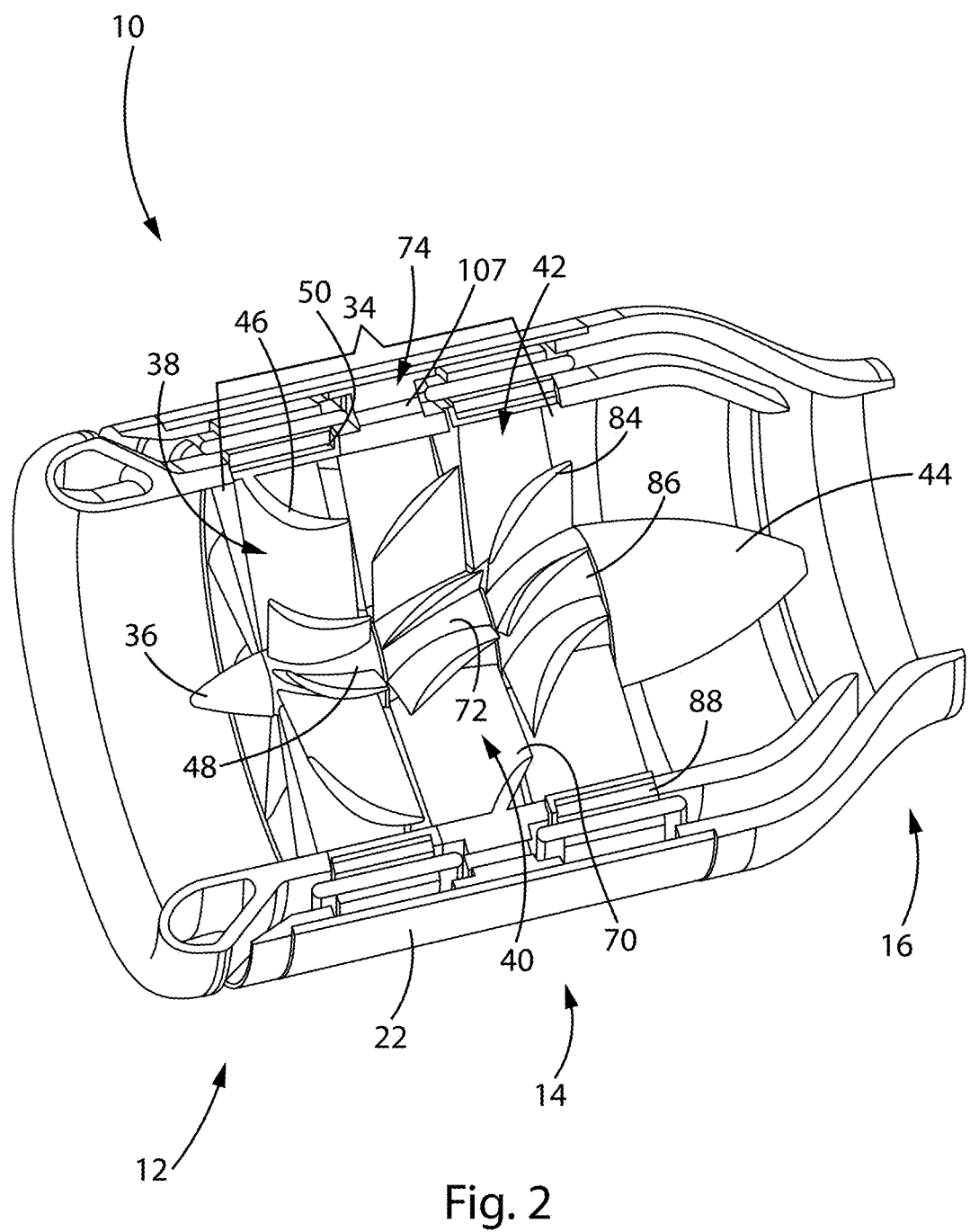
FIG. 2 is a particular cut-away view of FIG. 1.

With reference to FIG. 2, the electrically powered fan engine 10 also includes the electric fan assembly 34 in the energiser chamber 14.

The electric fan assembly 34 is surrounded by the wall 22, and includes a nose cone 36, a first rotor 38, a static guide vane 40, a second rotor 42, and an exhaust fairing 44. The first rotor 38, the static guide vane 40, and the second rotor 42, are positioned in axial alignment. The nose 36 and the exhaust fairing 44 are also in axial alignment with the first rotor 38, the static guide vane 40, and the second rotor 42.

The nose 36 may be made from an elastomer, such as rubber. Rubber is used to provide an anti-icing function. The nose 36 is substantially conical and protrudes into the intake into an in-coming air stream.

The first rotor 38 may also be called a front rotor due to it being in front of the static guide vane 40. The first rotor 38 includes a plurality of radially extending blades 46. The blades 46 are configured to receive a fluid from the inlet 12. The blades 46 have an aerofoil cross-section and have an angle of inclination with respect to the on-coming airflow. The blades 46 extend from a first hub 48 (or front hub) at the centre and a first rim 50.

Figure 3:
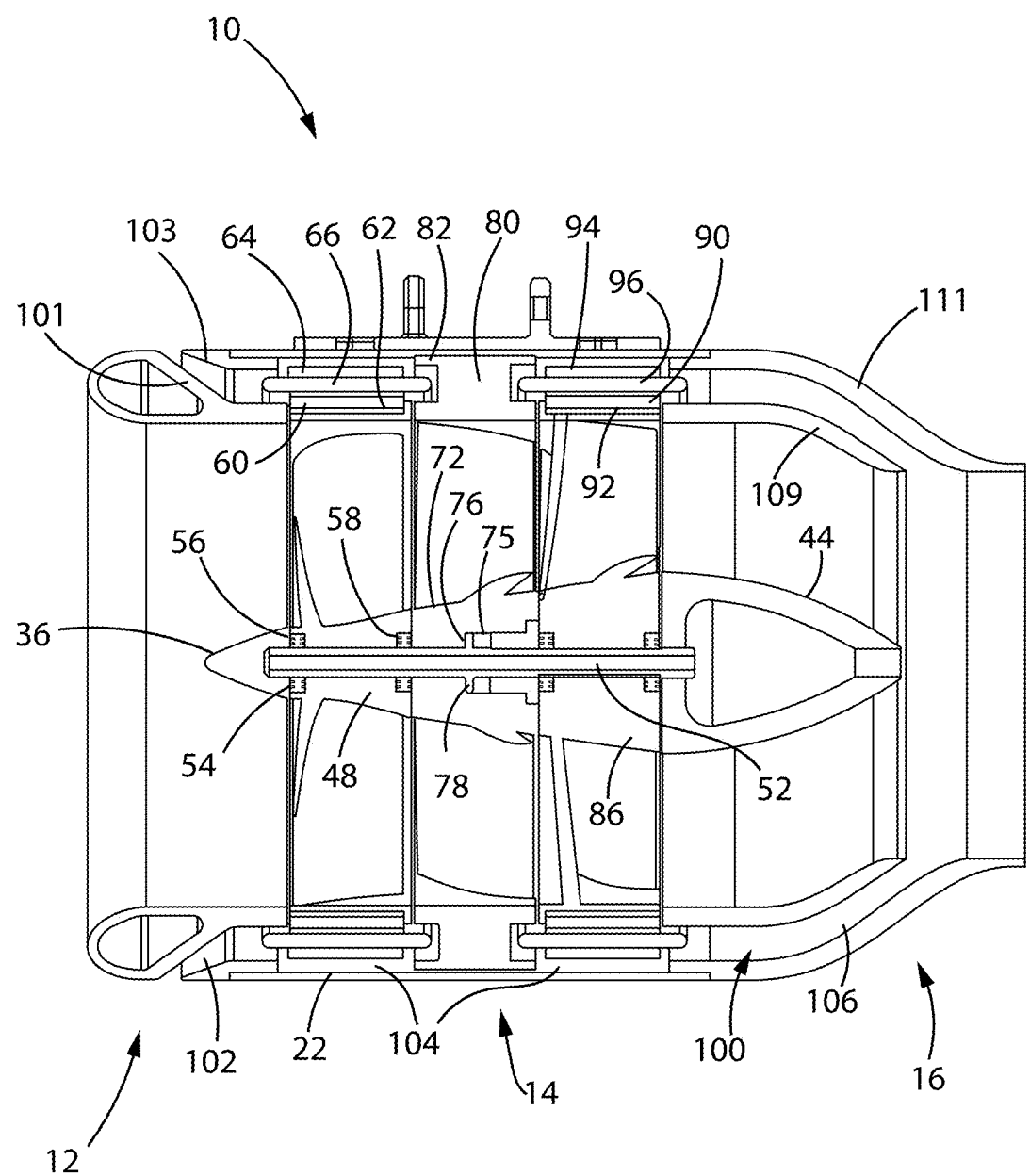
FIG. 3 is a cross-section view of the electrically powered fan engine from FIG. 1 on a plane passing through the centre-line thereof.

With reference to FIG. 3, the engine also includes a shaft 52 on bearings 54. A front bearing track 56 and a rear bearing track 58 are provided to house the bearings 54. The shaft 52 is divided into a front stub axle and a rear stub axle. The front hub 48 is thus journalled about the front stub axle. The first hub 48 is substantially trapezoidal in cross-section in shape and continues the profile of the conical nose 36, when viewed in cross-section.

With continued reference to FIG. 3, the first rim 50 is substantially cylindrical. The first rim 50 supports a plurality of permanent magnets 60 and a front rotor-iron 62. The permanent magnets 60 are separated from one another circumferentially around the first rim 50. The magnets 60 may be arranged in a Halbach array. In this embodiment, the motors are radial motors. In other embodiments, the motors can equally be axial motors.

With further reference to FIG. 3, the electrically powered fan engine 10 also includes a front stator iron 64 and a plurality of motor windings 66. The front stator iron may be a laminated stator iron 64. The front stator iron 64 is attached to an interior surface of the wall 22, whilst maintaining a fluid flow path between the wall 22 and the front stator iron 64 (see below on by-pass duct). The front stator irons 64 and the motor windings 66 are configured to the slotless. In other embodiments, they could by slotted. The motor windings 66 may be made from an electrically conductive material, for example copper or aluminium. The motor windings 66 may be energised by an electrical supply provided from a remote source. The remote source may be located external to the electrically powered fan engine, e.g. within the aircraft. The motor windings 66 may be energised by a direct current (DC) supply or, more likely, an alternating current (AC) supply. Where an AC supply is used, the supply may be single phase or, more likely, a polyphase supply.

For example, a three-phase AC supply is used in this example.

In this way, the front stator iron 64, the plurality of motor windings 66, the front rotor iron 62, and the permanent magnets 60, form an electromagnetic circuit configured to drive the rim (in this case, a front motor). The electromagnetic circuit may comprise an electric motor. Accordingly, the electrically powered fan engine 10 may be called an electric rim-driven fan. The electric motor may operate synchronously. For instance, the electric motor may be configured as a permanent magnet synchronous motor although a fan device may also be configured as an induction motor or a switched reluctance motor or a hybrid combination of such motor technologies.

With reference to FIG. 2, the static guide vane 40 includes a plurality of blades 70. Each blade has an aerofoil cross-section, and is inclined into the oncoming airflow. In this way, a pitch of the blades 70 may be different to a pitch of the blades 46 of the first rotor 38.

The blades 70 extend radially between a central hub 72 and a central rim 74. With reference to FIG. 3, the central hub 72 is substantially trapezoidal in cross-section, and follows a profile of the nose 36 and the first hub 48. The central hub 72 has a fluid passage 75 having a step 76 at a section where an interior diameter of the fluid passage 75 decreases from a first diameter to a second diameter. The shaft 52 includes a wall 78, or a flange. The wall 78 has an outer diameter between the first and second diameters of the central bore 75. In this way, the shaft 52 can fit within the central bore of the central hub 72, and the wall 78 can be attached to the step 76. In this way, the shaft 52 may be fixed in position relative to the static guide vane 40. In other words, the shaft 52 may be configured so it does not rotate. An axial extent of the shaft 52 is greater than that of the central hub 72 such that the shaft 52 provides a front stub axle and a rear stub axle upon which the front hub 48 and a rear hub 86 are journalled.

The central rim 74 has a substantially I-shaped cross-section having a body 80 extending between opposing ends 82, where the body 80 has a comparatively narrow width compared to the ends 82. The central rim 74 is attached to the wall 22 by the outer end 82. In this way, the static guide vane 40 is coupled to the pylon attachment 18 indirectly via the wall 22. Accordingly, thrust forces are transmitted through the static guide vane 40 to the pylon attachment 18 through the respective attachments to the wall 22. In other embodiments, the wall 22 may include a hole such that the central rim 74 is connected directly to the pylon attachment 18, again coupling the static guide vane to the pylon attachment 18.

With reference to FIG. 2, the second rotor 42 may also be called a rear rotor due to it being aft of the static guide vane 40. The second rotor 42 includes a plurality of radially extending blades 84. The blades 84 have an aerofoil cross-section and are inclined into the on-coming airflow. The blades 84 extend from a third hub 86 (or rear hub 86) at the centre and a third rim 88 (or rear rim 88).

A front bearing track 56 and a rear bearing track 58 are provided to house the bearings 54. The front hub 48 is thus journalled about the front stub axle. The first hub 48 is substantially trapezoidal in cross-section in shape and continues the profile of the conical nose 36, when viewed in cross-section.

With reference to FIG. 3, the rear hub 86 is journalled about the rear stub-axle. The rear hub 86 is substantially trapezoidal in cross-section and continues the profile of the conical nose 36, the first hub 48, and the central hub 72, when viewed in cross-section. In this way, the front hub 48, the central hub 72, and the rear hub 86, combine to form a substantially frusto-conical hub, having a surface area that gradually increases axially from the inlet 12 to the exhaust 16. The substantially frusto-conical hub also forms a substantially conical fairing due to its interaction with the fluid flowing through the energiser camber 14.

With continued reference to FIG. 3, the rear rim 88 is substantially cylindrical. The rear rim 88 supports a plurality of permanent magnets 90 and a rear rotor-iron 92. The permanent magnets 90 are separated from one another circumferentially around the rear rim 88. The magnets 90 may be arranged in a Halbach array.

With further reference to FIG. 3, the electrically powered fan engine 10 also includes a rear stator iron 94 and a plurality of motor windings 96. The rear stator iron 94 may be a laminated stator iron 94. The rear stator iron 94 is attached to an interior surface of the wall 22 as are the plurality of motor windings 96. The rear stator irons 94 and the motor windings 96 are configured to the slotless. In other embodiments, they may also be slotted. The motor windings 96 may be made from an electrically conductive material, for example copper or aluminium. The motor windings 96 may be energised by an electrical supply provided from a remote source. The remote source may be located external to the electrically powered fan engine, e.g. within the aircraft. The motor windings 96 may be energised by a direct current (DC) supply or, more likely, an alternating current (AC) supply. Where an AC supply is used, the supply may be single phase or, more likely, a polyphase supply. For example, a three-phase AC supply is used in this example.

The rear stator iron 94, the plurality of motor windings 96, the rear rotor iron 92, and the permanent magnets 90, form an electromagnetic circuit configured to drive a the rim (in this instance a rear motor). The electromagnetic circuit may comprise an electric motor.

Accordingly, the electrically powered fan engine may be called an electric rim-driven fan.

The electric motor may operate synchronously. For instance, the electric motor may be configured as a permanent magnet synchronous motor although a fan device may also be configured as an induction motor or a switched reluctance motor or a hybrid combination of such motor technologies. The electrical supply to the front motor and the rear motor may be independent.

Sealing devices (not shown) may be provided between the front rim 50 and the central rim 74, and between the central rim 74 and the rear rim 88. An example of a sealing device may include a dynamic seal such as an elastomeric ring. Examples includes a washer or an O-ring. Sealing devices may also be provided between the rim 20 and the front rim 50 and the rear rim 88 and the exhaust nozzle 16 (specifically the nozzle wall 109 as introduced below).

The exhaust fairing 44 may be substantially bullet shaped, or dome shaped.

It can be seen from the figures that the front rim 50, the central rim 74, and the rear rim 88, combine with the front hub 48, the central hub 72, and the rear hub 86, to provide the energiser chamber 14. For instance, an interior outer surface of the energiser chamber 14 is provided by cooperation of the front rim 50, the central rim 74, and the rear rim 88. An interior inner surface of the energiser chamber 14 is provided by the front hub 48, the central hub 72, and the rear hub 86.

With reference to FIG. 3, the electrically powered fan engine 10 includes a by-pass 100. The by-pass 100 includes a by-pass inlet 102, a by-pass duct 104, and a by-pass outlet 106. The by-pass inlet 102 may be a ram-air inlet. The rim 20 may include a ramped section 101 where the radius of an outer surface decreases. The by-pass inlet 102 is formed by the ramped section 101 of the rim 20 and an annular ramp 103 concentrically arranged outside the ramped section 101. The annular ramp 103 is attached to the rim 20 by means of radially extending brackets (not shown for brevity). The annular ramp 103 is attached to the wall 22 by including a recess for receiving the wall 22. In this way, exterior surfaces of the wall 22 and the annual ramp 103 are aligned and form a continuous surface.

The by-pass duct 104 includes a channel extending from the by-pass inlet 102 positioned upstream of the first rotor and the by-pass outlet positioned downstream of the second rotor. More specifically, the by-pass outlet 106 is positioned within the exhaust nozzle.

The central rim 74 includes a hole 107 (see FIG. 2) within the body 80 extending from fore to aft. The hole 107 may be a plurality of holes arranged circumferentially. In this way, the by-pass duct 104 is able to pass air from the inlet 102 to the outlet 106. The outlet 104 is provided as a channel formed between the wall 22 and the exhaust nozzle 16.

The by-pass outlet 106 is formed by the exhaust nozzle. The exhaust nozzle 16 includes an interior nozzle wall 109 and an exterior nozzle wall 111. The interior nozzle wall 109 is attached to the exterior nozzle wall 111 by means of brackets (not shown for brevity) arranged circumferentially around the nozzle. The exterior nozzle wall 109 is attached to the wall 22. In particular, the exterior nozzle wall 109 includes a recess at a fore end to receive the wall 22. Exterior surfaces of the wall 22 and the exterior nozzle wall 109 are aligned and form a continuous surface. The interior 109 and exterior 111 nozzle walls form the by-pass outlet 106 therebetween.

The front motor and the rear motor are positioned within the by-pass duct 102. More specifically, the front and rear rotor irons 62, 92, the magnets 60, 90, the front and rear stator irons 64, 94, and the motor windings 66, 96, are provided within the by-pass duct 102. In this way, by-pass air is able to reduce the temperature of the front and rear motor components.

During operation, current is supplied independently to the motor windings 66, 96. The electromagnetic interaction between the windings 66, 96, urges the magnets 60, 90 to move according to the right-hand rule. It is worth noting that since the windings 66, 96, are independently energised, rotational velocity of the front and rear rotors 38, 42, are independent. Velocity is taken herein to mean the angular speed and the direction. For example, the same velocity requires both speed and direction of rotation to be the same, whereas a different velocity requires at least one of the speed or the direction of rotation to be different. For instance, the first rotor 38 may be associated with a first direction, a first speed and a first velocity. The second rotor 42 may be associated with a first direction, a second speed and a second velocity. The first velocity may be different from the second velocity when the first and second directions differ and/or when the first and second speeds differ. The first velocity is the same as the second velocity when the first speed and the second speed are the same and when the first direction and the second direction are the same.

The increase in pressure across the front rotor 38 can be controlled separately to the pressure increased across the rear rotor 42, since the rotors are independently driven.

To increase the efficiency of the pressure increase, the front rotor 38 may be driven in an opposite direction to the rear rotor 42. In this way, the rotors 38, 42, may contra-rotate.

Contra-rotating rotors 38, 42 increases the efficiency of the electrically powered fan engine 10 by increasing the pressure gain, and reducing swirl momentum in the fluid flow in the energiser chamber 14 compared to a case where the rotors 38, 42, rotate in the same direction as is the case with GB1282485 where the front and rear rotors are driven dependent on each other.

The frusto-conical hub formed by the front hub 48, the central hub 72, and the rear hub 86, reduces a cross-sectional area of a fluid flow path through the energiser chamber 14. In this way, the front rim 50, the central rim 74, and the rear rim 88, in addition to the front hub 48, the central hub 72, and the rear hub 86, cooperate to reduce the flow area through the energiser chamber. In particular, the front rim 50, the central rim 74, and the rear rim 88, in addition to the front hub 48, the central hub 72, and the rear hub 86 cooperate to reduce the flow area through the energiser chamber 14. The reduction in cross-sectional area is gradual and substantially consistent along an axial length of the energiser chamber 14. The reduction in cross-sectional area of the annulus helps to maintain the pressure increase induced in the fluid stream by rotation of the front rotor 38 and the rear rotor 42. The bullet shaped exhaust fairing 44 compliments an interior convergence of the interior exhaust nozzle 109. In this way, the exhaust fairing 44 and the exhaust nozzle 16 cooperate the maintain the cross-sectional flow area substantially constant in the exhaust 16. This reduces the risk of the air decelerating.

The guide vane 40 serves to direct the fluid flow to a leading edge of the blades 84 of the rear rotor 42 at an angle of incidence that increases the pressure gain induced by the blades 84. In this way, the blades 84 of the rear rotor 42 are less likely to operate in an aerodynamically stalled condition.

Due to the front rotor 38 and the rear rotor 42 rotating relative to the static guide vane 40, the sealing devices help maintain the pressure increase by reducing air leakage paths between the rotors 38, 42, and the adjacent static structures.

The bearings 54 being located within the front and rear bearing tracks 56 and 58 around the shaft 52, locates the bearing structures out of the airflow. As a result, a reduction in drag occurs compared to GB1282485 where the central shaft rotates as one with the rotors being fixed to it. The arrangement in GB1282485 requires bearing arrangements at either end of the central shaft within the airflow causing a drag increase and efficiency reduction of the electrically powered fan engine 10. Aside from the drag reduction, the arrangement of the present disclosure also reduces structural effects such as vibration where the shaft can vibrate and wobble due to its inherent length and the moment applied to the shaft during rotation of the rotors as would be the case with GB1282485.

Whilst the present disclosure has been explained as the embodiment described above with reference to FIGS. 1 to 3, the inventive concepts contained herein may be extended to various other embodiments falling within the scope of the appended claims. For instance, the device 10 may include two axially aligned rotors or may be an assembly of three or more axially aligned rotors wherein each rotor is located in front of or behind a static guide vane.

The subject-matter of the present disclosure may be described more briefly as follows.

Referring to the accompanying drawings, FIGS. 1,2 and 3 show a fan device of the invention having a forward intake section a central energiser section and an aft exhaust nozzle section. The central energiser section houses a forward fan rotor and an aft fan rotor. The fan-rotors are able to rotate, by means of bearings which are supported on a shaft fixed to a static guide vane structure which is attached to the duct casing. Around the periphery of each fan rotor is a rim that supports the permanent magnets and the rotor back-irons. In this example the rotor magnets are arranged in a Halbach array.

Attached to the duct casing are the laminated stator irons and the conductor windings of the motor circuits. In this example the stator irons and conductor windings are configured to be slotless. The hub regions of the fan rotors and the guide vane structure are conical in form and tapered in order to progressively reduce the air-flow annulus-area from the nose cone, located at the ducted fan intake, to the bullet fairing located at the ducted fan outlet.

In order to provide a source of air, to cool the rotor back-irons and magnets and the stator irons and conductor windings, an air-inlet aperture is located around the external peripheral surface of the ducted fan device between the intake lip and the duct casing.

To facilitate the passage of the cooling air ventilation passages are provided in the static guide vane structure. The cooling air is exhausted into the fan efflux air by means of the double-walled air channel.

In order to generate an airflow through the ducted fan device, the fan rotors are caused to rotate in opposite directions (contra-rotate) by the energisation of the electrical motor circuitry acting on the rims of the fan rotors. The fan rotors may be provided with sealing devices to minimise air leakage paths between the rotating fans and their adjacent static structures.

Certain aspects of the present disclosure are included in the following clauses.

Clause 1. An electrical rim driven fan device intended for aircraft propulsion having two fan-rotors configured to contra-rotate with each fan-rotor being supported on an axle which is mechanically attached to a static support structure that is positioned in axial alignment between the two fan rotors.

Clause 2. A rim driven fan device as claimed in Clause 1 wherein the static support structure is configured with aerodynamically shaped radially arranged vanes that guide the direction of the airflow that leaves the forward fan-rotor blades in such a manner as to impinge on the aft fan-rotor blades at the optimum angle necessary to ensure efficient aerodynamic performance.

Clause 3. A rim driven fan device as claimed in Clause 1 or Clause 2 wherein the hub region is configured to be conically shaped in order to progressively reduce the cross-sectional annulus-area of the internal flow-channel as the air-flow passes through the fan device.

Clause 4. A rim driven fan device as claimed in any preceding clause, wherein the device is electrically configured so that the rotational speed of each fan-rotor is independently controllable.

Clause 5. A rim driven fan device as claimed in any preceding clause, wherein the device is configured with an air-cooled motor arrangement that uses the fan exhaust air-flow to induce a secondary cooling air-flow to enter via an externally located vent aperture and flow past the peripherally placed motor conductor windings and magnets and then exhaust with the main fan air-flow.

Clause 6. A rim driven fan device as claimed in Clause 1, Clause 2, Clause 3 or Clause 4, wherein the device is configured with a liquid-cooled motor arrangement that incorporates the intake lip, fan-stator or fan casing structure as liquid to air heat exchangers.

The invention claimed is:

1. An electrically powered fan engine including:
   an energiser chamber between an inlet and an exhaust of the electrically powered fan engine;
   a first rotor within the energiser chamber, the first rotor including a plurality of blades and being configured to receive a fluid from the inlet and configured to rotate at a first velocity; and
   a second rotor within the energiser chamber, the second rotor including a plurality of blades and being configured to receive the fluid after passing through the first rotor and configured to rotate at a second velocity,
   wherein the first velocity is different from the second velocity,
   wherein the first rotor includes a rim and the second rotor includes a rim,
   wherein the electrically powered fan engine further comprises a first electromagnetic circuit configured to drive the rim of the first rotor and a second electromagnetic circuit configured to drive the rim of the second rotor,
   wherein the electrically powered fan engine further comprises a by-pass duct extending between a by-pass inlet and a by-pass outlet, wherein the by-pass inlet is positioned upstream of the first rotor, and wherein the by-pass outlet is positioned in the exhaust nozzle, and
   wherein the first electromagnetic circuit and the second electromagnetic circuit are each provided within the by-pass duct for cooling, in-use.

2. The electrically powered fan engine of claim 1, wherein the first rotor is configured to rotate in a first direction, the second rotor is configured to rotate in a second direction, and wherein the first direction is different from the second direction.

3. The electrically powered fan engine of claim 1, wherein the first rotor and the second rotor are independently driven, and wherein a first speed of the first rotor is different from a second speed of the second rotor.

4. The electrically powered fan engine of claim 1, wherein the first rotor and the second rotor are axially aligned.

5. The electrically powered fan engine of claim 1 further comprising a static guide vane between the first rotor and the second rotor, the static guide vane include a plurality of blades configured to control an angle of incidence of the fluid to the blades of the second rotor.

6. The electrically powered fan engine of claim 5, wherein the first rotor, the static guide vane, and the second rotor each include a hub from which the respective blades extend radially.

7. The electrically powered fan engine of claim 6, wherein the hubs of each of the first rotor, the static guide vane, and the second rotor cooperate with an interior surface of the energiser chamber to gradually decrease a cross-sectional area of the energiser chamber from the inlet to the exhaust.

8. The electrically powered fan engine of claim 7, wherein the hubs of each of the first rotor, the static guide vane, and the second rotor combine to form a substantially frusto-conical shaped surface having a diameter that gradually increases from the inlet to an exhaust.

9. The electrically powered fan engine of claim 6, wherein the hub of the static guide vane includes a front stub axle and a rear stub axle respectively extending fore and aft therefrom, and wherein the hub of the first rotor and the hub of the second rotor are journalled about the respective front and rear stub axles.

10. The electrically powered fan engine of claim 5 further comprising a pylon attachment, wherein the static guide vane is coupled to the pylon attachment to transmit a thrust force thereto.

11. The electrically powered fan engine of claim 1 further comprising an exhaust nozzle at the exhaust and an exhaust fairing extending from the hub of the second rotor, wherein the exhaust nozzle and the exhaust fairing cooperate to maintain a cross sectional area of the exhaust from the energiser chamber to downstream.

12. The electrically powered fan engine of claim 11, wherein the exhaust nozzle is convergent and the exhaust fairing is substantially bullet shaped.

13. The electrically powered fan engine of claim 1, wherein the first electromagnetic circuit includes a plurality of windings and a stator iron mounted to a wall surrounding the energiser chamber and a rotor iron and a plurality of magnets mounted to the rim of the first rotor, and wherein the second electromagnetic circuit includes a plurality of windings and a stator iron mounted to the wall surrounding the energiser chamber, and a rotor iron and a plurality of windings mounted to the rim of the second rotor.

14. The electrically powered fan engine of claim 1, wherein the static guide vane includes a rim coupled to an interior surface of the wall, wherein the rim includes a fluid passage to enable fluid to pass from the by-pass inlet to the by-pass outlet.

15. The electrically powered fan engine of claim 1, wherein the electrically powered fan engine is for providing thrust and/or lift to an aircraft.

16. The electrically powered fan engine of claim 1, wherein the fluid is air.

17. An aircraft comprising the electrically powered fan engine of claim 1.

18. An aircraft comprising the electrically powered fan engine of claim 1.

* * * * *